United States Patent [19]
Purdey

[11] 3,954,609
[45] May 4, 1976

[54] PARTICULATE SOLID MATERIALS

[75] Inventor: John Anthony Purdey, Cornwall, England

[73] Assignee: English Clays Lovering Pochin & Company Limited, Cornwall, England

[22] Filed: May 28, 1974

[21] Appl. No.: 474,069

[30] Foreign Application Priority Data
May 29, 1973 United Kingdom............... 25609/73

[52] U.S. Cl................................... 210/54; 210/67; 210/69; 106/306; 423/518
[51] Int. Cl.² ........................................... F26B 7/00
[58] Field of Search ................. 210/42, 54, 69, 73, 210/67, 65, 66, 58; 106/306; 423/518

[56] References Cited
UNITED STATES PATENTS

| | | | |
|---|---|---|---|
| 2,345,311 | 3/1944 | Wilson | 106/306 |
| 3,615,768 | 10/1971 | Winyall | 106/306 |
| 3,674,529 | 7/1972 | Toms | 106/306 |

FOREIGN PATENTS OR APPLICATIONS

| | | |
|---|---|---|
| 1,234,895 | 2/1967 | Germany |
| 1,274,850 | 5/1972 | United Kingdom |

Primary Examiner—Charles N. Hart
Assistant Examiner—Benoit Castel
Attorney, Agent, or Firm—Larson, Taylor and Hinds

[57] ABSTRACT

A process is disclosed whereby aqueous slurries of particulate solid materials having a relatively low solids content are converted to aqueous slurries having a relatively high solids content. The process includes deflocculating a mixture comprising a particulate solid material and water with the aid of a chemical deflocculating agent to form a first aqueous slurry, partially dewatering the first aqueous slurry in, for example, a pressure filter to form a cake having a reduced water content as compared to the mixture and subjecting the cake to mechanical work which comprises at least one cycle of applying a stress to the cake and relaxing the applied stress to form a second aqueous slurry having an increased solids content as compared to the first aqueous slurry.

9 Claims, 1 Drawing Figure

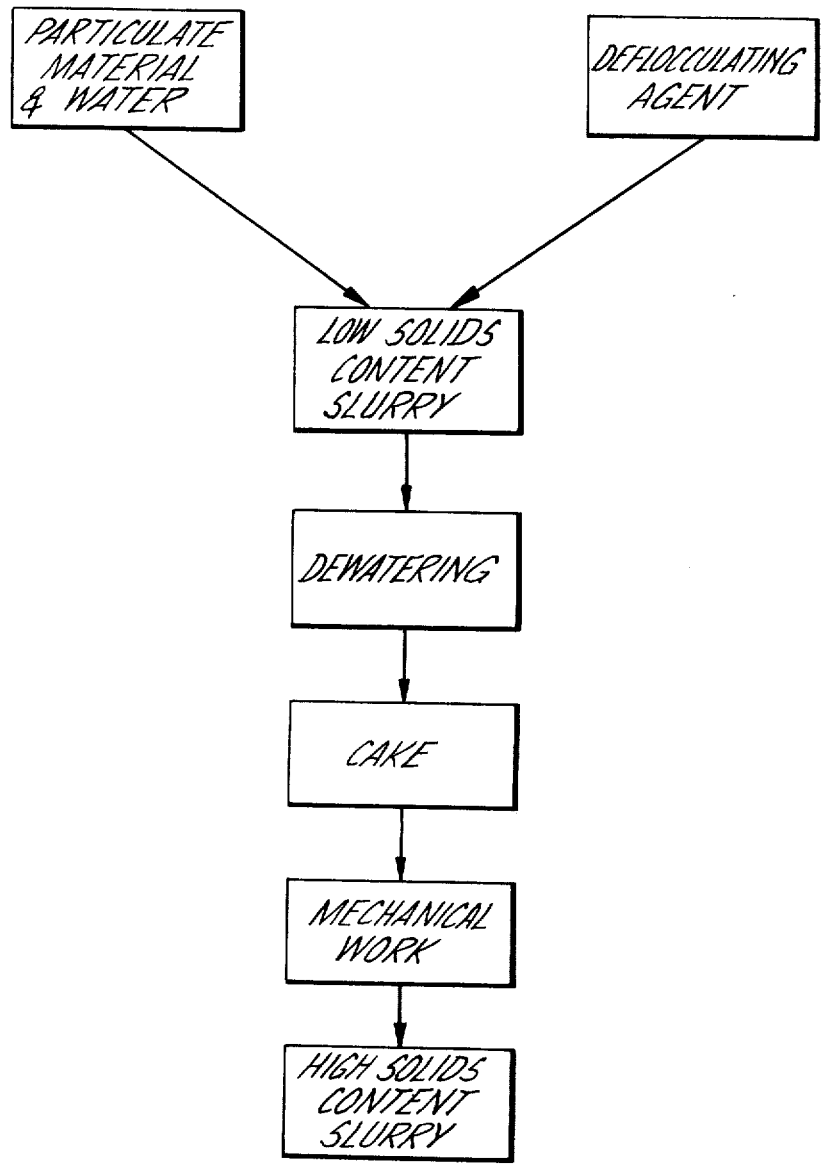

PARTICULATE SOLID MATERIALS

BACKGROUND OF THE INVENTION

1. Field of the Invention

This invention relates to particulate solids and, more particularly but not exclusively, is concerned with satin white.

2. Description of the Prior Art

Satin white is a calcium sulphoaluminate and can be represented by the formula $3CaO.Al_2O_3.3CaSO_4.31-H_2O$. It is used inter alia in paper coating compositions as a white pigment which imparts high brightness and gloss and good printability to the coated paper. Satin white may be prepared by reacting aluminium sulphate with slaked lime, the resulting material being stored and transported in the form of a moist paste. Thus, in one process for preparing satin white a concentrated aluminium sulphate solution is added to a paste of slaked lime and the materials mixed in a high density mixer. The amount of water used in this method is such that the product is obtained in the form of a moist paste containing about 30% by weight of solids. In another process, a solution containing about 10% by weight of aluminium sulphate is sprayed into a slurry containing about 5% by weight of calcium hydroxide until reaction is completed. The resulting slurry is then pressure-filtered to give a moist filter cake, or paste, containing from 20 to 35% by weight of solids. On account of the high viscosity of aqueous suspensions of satin white it has not been found to be possible by conventional methods to prepare a paste containing more than about 35% by weight of solids and this means that when satin white is transported in this form it has associated with it nearly twice its weight of water.

Satin white contains a large amount of water of crystallisation and it rapidly becomes dehydrated if it is contacted with hot dry air. It can be dried by contacting the paste with air under closely controlled conditions of temperature and humidity, as is described in British Patent Specification No. 1,274,850, but careful control of the process is needed and, as satin white is generally required to be redispersed in water for incorporation into a paper coating composition, many customers prefer to receive satin white which is already dispersed in water.

In British Patent Specification No. 1,250,514 there is disclosed a process for dewatering satin white by means of a tube pressure filter whereby there can be obtained a filter cake, having a solids content ranging from about 50 to about 80% by weight, which is hard, brittle and non-sticky. However, although the filter cake is redispersable in water, apparatus must be provided by the customer for this purpose and a considerable amount of energy must be expended in effecting the redispersion. It is clearly desirable therefore to be able to produce a satin white slurry which has a solids content in excess of about 50% by weight and which can be dispersed in water without the need for expensive, high-powered equipment or for the expenditure of large quantities of energy.

It is known to increase the solids content of an aqueous solids suspension, to which there may be added a flocculating agent, by at least partially dewatering the solids suspension and adding a deflocculating agent thereto to form a slurry having an increased solids content.

BRIEF SUMMARY OF THE INVENTION

According to the present invention there is provided a process for preparing an aqueous slurry of a particulate solid material wherein a mixture comprising the particulate solid material and water is deflocculated with a chemical deflocculating agent to form a first aqueous slurry; wherein said first aqueous slurry is dewatered to form a cake having a reduced water content as compared with said paste; and wherein said cake is subjected to mechanical work which comprises at least one cycle of applying a stress to the cake and relaxing the applied stress to form a second aqueous slurry of said particulate solid material.

BRIEF DESCRIPTION OF THE DRAWING

The essential steps of the process according to the invention are illustrated with aid of the accompanying diagrammatic drawing.

DETAILED DESCRIPTION OF THE INVENTION

The process according to the present invention is particularly suitable for producing a satin white slurry and, in accordance with an embodiment of the present invention, there is provided a process for preparing an aqueous slurry of satin white wherein a mixture comprising satin white and water, and containing up to about 35% by weight of solids, is deflocculated with a chemical deflocculating agent to form a first aqueous slurry; wherein the first aqueous slurry is pressure filtered at a pressure of at least 250 p.s.i.g. ($1.72 \times 10^6 Nm^{-2}$) to form a cake having a solids content of at least 50% by weight; and wherein the filter cake is subjected to mechanical work which comprises at least one cycle of applying stress to the cake and relaxing the applied stress to form a second aqueous slurry of satin white having solids content of at least 50% by weight.

Generally, the mixture comprising the particulate solid material, e.g. satin white, and water which is dewatered will contain at least 20% by weight of solids.

The chemical deflocculating agent used to defloculate the mixture before it is dewatered may be, for example, casein or soya protein in alkaline solution, sodium carboxymethyl cellulose or water-soluble salts of hydroxycarboxylic acids, or condensed phosphates in combination with deflocculating agents of the casein or soya protein or carboxymethyl cellulose types. However, the preferred types of deflocculating agent are the water-soluble salts of (a) poly (acrylic acid), (b) poly (methacrylic acid) or (c) copolymers which contain at least 30 molar percent of a first repeating unit having the general formula

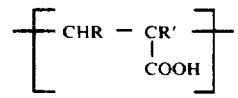

wherein R is hydrogen, a lower alkyl group, a carboxylic acid group or a lower alkyl carboxylate (— COO Alk) group and R' is hydrogen or a lower alkyl group and not more than 70 molar percent of a second repeating unit having the general formula

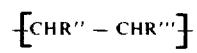

where R'' is hydrogen or a lower alkyl group and R''' is chlorine, a lower alkyl carboxylate — COO Alk) group or a phenyl or substitute phenyl group; and in each case the number average molecular weight of the polymer or copolymer should be in the range of from about 700 to about 10,000. The amount of these preferred chemical deflocculating agents required is in the range of from 1 to 4% by weight based on the weight of dry particulate solid material, e.g. satin white, but when other deflocculating agents are used it may be necessary to employ as much as 15% by weight of deflocculating agent based on the weight of dry particulate solid material.

The deflocculated mixture is preferably dewatered in a pressure filter, for example a tube pressure filter of the kind disclosed in British Patent Specification No. 1,240,465, although other kinds of pressure filter may be used, for example that disclosed in Belgian Patent Specification No. 778,891. Alternatively, dewatering of the deflocculated particulate solid material may be carried out, for example, in high-speed centrifugal dewatering apparatus. It has been found to be advantageous to maintain the pressure in the pressure filter for a period after the flow of filtrate has substantially stopped; and this period may be up to twice as long as the period during which filtrate is flowing freely.

The water content of the dewatered cake may be further reduced by contacting the cake with air under closely controlled conditions of temperature and humidity as described in British Patent Specification No. 1,274,850.

The mechanical work will generally be carried out within an apparatus provided with means suitable for containing the second aqueous slurry as the latter is formed.

The mechanical work may be performed by a jaw crusher or by a dough mixer of the sigma or z-blade type. If a jaw crusher is used it is generally necessary to pass the cake through the crusher more than once. Generally from two to six passes have been found to give a satisfactory product. If a dough mixer is used it is generally advantageous to subject the cake to a light crushing prior to the treatment in the dough mixer. The light crushing may be effected by a single pass through a jaw crusher or by a finger crusher, i.e. apparatus comprising a trough in the bottom portion of which there is a grid of parallel bars and one or more rotating horizontal shafts on which are mounted fingers or radiating pegs, conveniently disposed in a helical pattern, the tips of the fingers projecting between the bars of the grid so as to force material placed in the trough through the grid. A convenient spacing for the bars of the grid has been found to be about ½ to 1½ inch (13–38 mm). Other apparatus which can be used includes trough mixers, ribbon mixers, paddle mixers and ball, pebble and rod mills. One criterion may be that the cake should be subjected to intermittent shearing forces or should be sheared first in one direction and then in another. If the cake is subjected to a continuous shearing force in the same direction as may occur, for example, in a hammer mill or roller pan crusher the material will stick to either the moving or stationary parts of the apparatus and discharge will be impossible.

The amount of mechanical work required for a particular material to convert the cake into a slurry can be determined experimentally for each apparatus used and material being treated. For example, it has been found experimentally that to convert a cake of satin white to a slurry by passing the cake several times through a jaw crusher operating at about 400 r.p.m., the energy dissipated in the jaw crusher should be between about 30 and about 60 horsepower hours per ton of satin white on a dry weight basis (about 80 to about 160 kilojoules per kilogram of satin white on a dry weight basis) and the energy dissipated when the cake was passed once through a jaw crusher and then processed in a dough mixer of the sigma or z-blade type operating at about 100 r.p.m. was between about 40 and about 50 horsepower hours per ton of satin white on a dry weight basis (about 105 to about 130 kilojoules per kilogram of satin white on a dry weight basis).

After the slurry has been formed it may be subjected to agitation in, for example, a turbine mixer to ensure homogeneity of the slurry.

Advantageously the cycles of applying a stress to the cake and relaxing the applied stress are applied at a frequency of up to about 20 cycles per second and preferably at a frequency of up to about 10 cycles per second.

When satin white slurry is pressure filtered at a pressure of 250 p.s.i.g. or more a cake is formed which is hard and brittle and which appears dry on the surface but it is believed that it contains a considerable quantity of water below the surface in pores in the body of the cake. When pieces of cake are subjected to mechanical work of the type described above (provided that the absorbed water contains a dissolved chemical deflocculating agent), water is released from the pores and a slurry is formed.

The invention is illustrated by the following Examples.

EXAMPLE 1

A paste of satin white prepared by a conventional method and containing 32% by weight of solids was first deflocculated by adding with agitation 2.2% by weight, based on the weight of dry satin white, of a sodium polyacrylate deflocculating agent having a number average molecular weight of 1650. The fluid suspension thus formed was then divided into four portions which were pressure filtered in a tube pressure filter of the type described in British Patent Specification No. 1,240,465 under different conditions of pressure and cycle time. In each case filter cakes were formed which were hard and brittle. The solids content of each sample of filter cake was measured and the results are given in Table I below:

Table I

| Portion No. | Pressure (p.s.i.g.) | (Nm$^{-2}$×10$^6$) | Cycle Time (min.) | % by weight of solids |
|---|---|---|---|---|
| 1 | 500 | 3.4 | 19.5 | 53.8 |
| 2 | 900 | 6.2 | 11.5 | 57.2 |
| 3 | 1200 | 8.3 | 13.5 | 58.7 |
| 4 | 1500 | 10.3 | 5.25 | 60.3 |

The cycle times given in Table I include 1 minute for "down time" i.e. the time taken to open and close the tube pressure filter and to remove the cake by blasts of compressed air. The remaining time represents the time for filtering and squeezing the cake which was in each case approximately twice as long as the time which would normally be allowed for the filtration step in tube pressure filter practice. In other words the filtration step was prolonged for a time which was approximately twice as long as the time taken to reach what is conventionally regarded as the "end point" which is generally considered to be when the filtrate has ceased to flow freely; but with satin white, as there is no well defined end point, the filtration step was continued until the flow of filtrate slowed down to 1 drip per second or about 20 ml per minute.

Each portion of filter cake was then passed repeatedly through a jaw crusher until a fluid suspension was formed. In each case the number of passes through the jaw crusher was in the range 3 to 6. The fluid suspensions were then each agitated for 20 minutes in a laboratory turbine mixer manufactured by Etablissements Cellier of Aix-les-Bains, France, no further deflocculating agent being added. At the end of this time the suspensions were poured through a No. 100 mesh B.S. sieve (nominal aperture 150 μm) and it was found that in no case was any residue retained on the sieve.

EXAMPLE 2

An attempt was made to repeat the experiment of Example 1 but without using the sodium polyacrylate dispersing agent in the initial stage. The paste of satin white having an initial solids content of 32% by weight was thinned with water to a solids content of 10% by weight to make it more fluid and pumpable and it was then pressure filtered in a tube pressure filter at a pressure of 1500 p.s.i.g. and for 5.5 minutes. The cake thus formed was hard and brittle and was found to have a solids content of 66.2% The cake was passed six times through a jaw crusher but the result was a lumpy material rather than a fluid slurry. The lumpy material was agitated in the laboratory turbine mixer for 20 minutes with the addition of 20% by weight of water based on the initial weight of cake and 2.2% by weight based on the weight of dry satin white, of a sodium polyacrylate deflocculating agent and a fluid suspension was formed but, when this was poured through a No. 100 mesh B.S. sieve on completion of the mixing time, a residue was deposited on the sieve which amounted to about 10% by weight of the total solids content of the filter cake.

EXAMPLE 3

A sample of the filter cake formed from Portion No. 4 of Example 1 was passed once through a jaw crusher and was then subjected to further mechanical work in a sigma blade mixer. After 3 minutes a smooth slurry was formed which was transferred to a laboratory turbine mixer and agitated for 20 minutes. The slurry was poured through a No. 100 mesh B.S. sieve and no residue was retained on the sieve.

From the foregoing description and examples, it will be seen that many modifications of the invention are possible without departing from the scope of the invention.

I claim:

1. In a process for preparing an aqueous slurry of satin white containing at least about 50% by weight of solids from a mixture comprising satin white and water, the process comprising the steps of deflocculating the mixture with a chemical deflocculating agent to form a first aqueous slurry containing from about 20 to 35% by weight of solids and dewatering said first aqueous slurry by pressure filtration at a pressure of at least 250 psig to form a cake having a reduced water content as compared with said mixture, the improvement which comprises subjecting said cake to mechanical work which comprises at least one cycle of applying a stress to the cake and relaxing the applied stress without the addition of any further water to form a second aqueous slurry of satin white containing at least about 50% by weight of solids.

2. A process according to claim 1, wherein the cycles of applying a stress to the cake and relaxing the applied stress are applied at a frequency of up to about 20 cycles per second.

3. A process according to claim 2, wherein the cycles of applying a stress to the cake and relaxing the applied stress are applied at a frequency of up to about 10 cycles per second.

4. A process according to claim 1, wherein mechanical work is provided by passing the cake at least once through a jaw crusher.

5. A process according to claim 4, wherein the cake is passed through the jaw crusher between 2 and 6 times.

6. A process according to claim 1, wherein mechanical work is provided by processing the cake in a dough mixer of the sigma or z - blade type.

7. A process according to claim 1, wherein mechanical work is provided by passing the cake once through a jaw crusher and thereafter by processing the crushed cake in a dough mixer of the sigma or z - blade type.

8. A process according to claim 1, wherein, after the cake has been subjected to mechanical work, the second aqueous slurry is subjected to agitation.

9. A process according to claim 1, wherein the mixture is deflocculated by adding to the mixture between about 1 and about 4% by weight, based on the weight of dry satin white, of a chemical deflocculating agent having a number average molecular weight of between about 700 and about 10,000 which is selected from the group consisting of (1) a water-soluble salt of poly(acrylic acid); (2) a water-soluble salt of poly(methacrylic acid); and (3) a water-soluble salt of a copolymer which contains at least 30 molar percent of a first repeating unit having the general formula

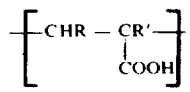

wherein R represents hydrogen, a lower alkyl group, a carboxylic acid group or a lower alkyl carboxylate + COO Alk) group and R' represents hydrogen or a lower alkyl group and not more than 70 molar percent of a second repeating unit having the general formula

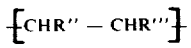

wherein R" represents hydrogen or a lower alkyl group and R'" represents chlorine, a lower alkyl carboxylate + COO Alk) group or a phenyl or substituted phenyl group.

* * * * *